C. BORNMANN.
FILM PACK PHOTOGRAPHIC APPARATUS.
APPLICATION FILED DEC. 12, 1911.
1,031,516.
Patented July 2, 1912.
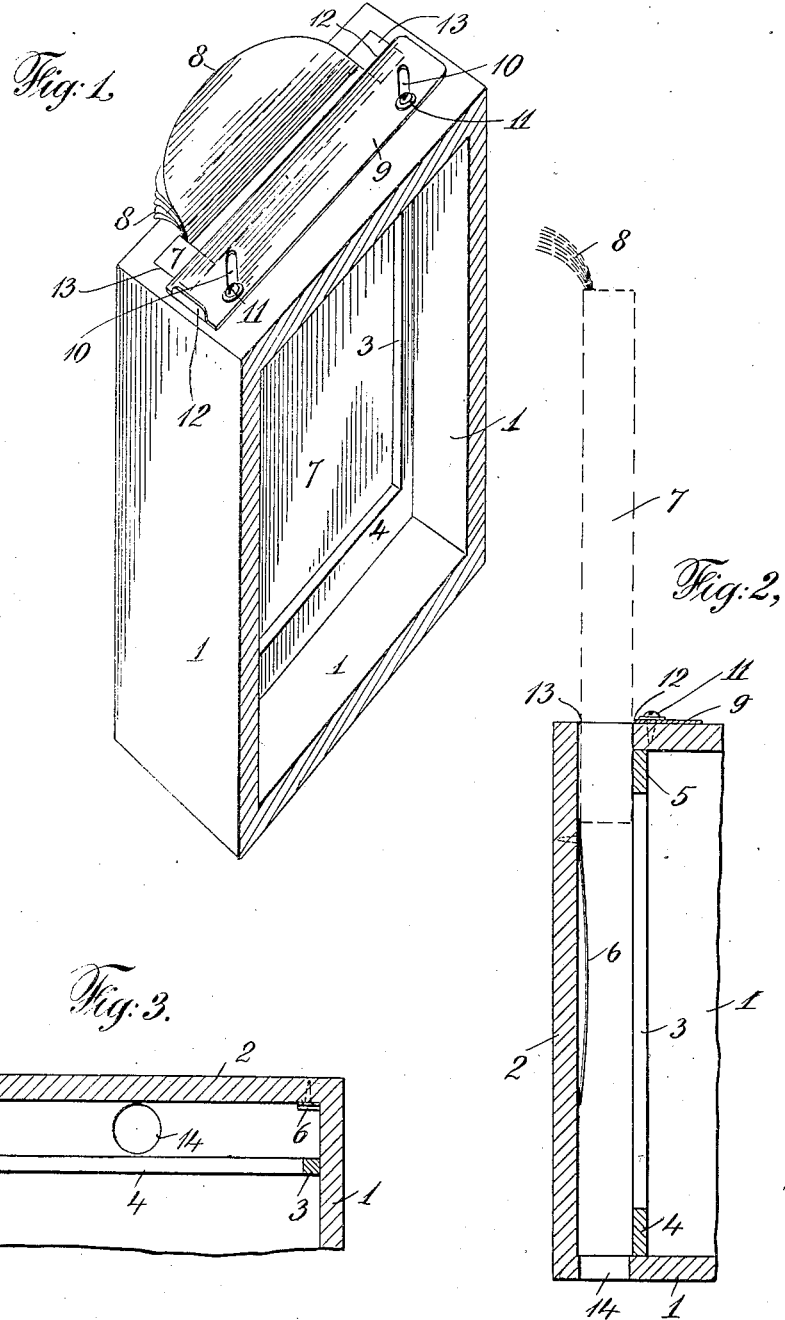
Witnesses:
Max B. A. Doring
F. M. Ousbach
Carl Bornmann  Inventor
By his Attorney
Phillips Abbott

UNITED STATES PATENT OFFICE.

CARL BORNMANN, OF BINGHAMTON, NEW YORK, ASSIGNOR TO ANSCO COMPANY, OF BINGHAMTON, NEW YORK.

FILM-PACK PHOTOGRAPHIC APPARATUS.

1,031,516.          Specification of Letters Patent.      Patented July 2, 1912.

Application filed December 12, 1911. Serial No. 665,201.

*To all whom it may concern:*

Be it known that I, CARL BORNMANN, a citizen of the United States, and a resident of the city of Binghamton, county of Broome, State of New York, have invented a new and useful Improvement in Film-Pack Photographic Apparatus, of which the following is a full, clear, and exact description.

It is the purpose of this invention to provide means whereby photographic cameras adapted to use film packs and also film pack holders may be inexpensively constructed and yet afford convenient means for introducing and holding the film pack in proper focal position and in such manner as to protect it from being light struck.

In the drawings hereof I show the invention as applied to the rear part of an ordinary box camera. Obviously it is equally adapted to a folding camera as well as to cameras of other construction.

Figure 1 illustrates a perspective view of the invention, showing the film pack in position in the rear of the camera; Fig. 2 illustrates a vertical sectional view of that which is shown in Fig. 1, the film pack being shown in dotted lines in the act of being introduced into the rear of the camera; and Fig. 3 illustrates a horizontal sectional view of Fig. 1 taken about midway of its height.

1 represents the rear of the camera the back 2 of which is in this instance shown as a solid board.

3, 3, are ribs which extend up the side of the interior of the camera and connect at the bottom with a cross bar or plate 4 and at the top with a similar cross bar or plate 5. The rear edges of these bars 3 and plates 4 and 5 coincide with the focal plane of the camera.

6 are springs fastened to the back board 2 of the camera, which by their pressure against the film pack 7, press it always forwardly against the rear edges of the parts 3, 4 and 5 and consequently maintain the most forward film always in the focal plane.

8 are the usual tabs whereby the individual films are manipulated.

9 is a plate, preferably of metal, but it may be made of hard rubber or any other suitable material, provided with two slots 10, 10, in which engage screws 11, 11, and a thumb piece 12 at one end. It will be observed that these slots are arranged at an angle relative to the axial line of the plate 9 and the construction is such that when the plate is drawn outwardly, that is to say, to the left in Fig. 1, so that the screws 11, 11, are at the opposite ends of the slots 10, that then the rear edge 12 of the plate is withdrawn, as shown in Fig. 2, so that it is practically even with the forward edge of the opening 13 in the top of the camera through which the film pack is introduced.

14 is a hole which is large enough to admit the end of a finger or a suitable utensil, as for instance, a pencil, to aid in pushing out the pack after the desired exposures have been made.

The operation is as follows: When it is desired to introduce the pack, the handle 12 on the diagonally sliding plate 9 is taken hold of and that plate is drawn laterally, that is to the left as shown in Fig. 1, whereupon the screws 11 passing through the slots 10, 10, cause the plate to move in a diagonal and parallel direction and to uncover the full width of the opening 13 in the upper side of the camera, as shown in Fig. 2; thereupon the film pack with the tabs 8 uppermost and with its front side forwardly is inserted in the opening 13 and gently pressed down by the hand until it has passed entirely within the space provided for it in the rear of the camera and when in that position, the springs 6 which are put under tension by the entrance of the pack will press it forwardly against the rear side of the vertical bars 3, 3, and the horizontal bars or plates 4, and 5, thus properly locating it in the focal plane. Thereupon the sliding plate 9 is pushed back again into the position shown in Fig. 1, during which the screws 11, 11, will pass through the diagonal slots 10, 10, in the opposite direction and the front edge 12 of the plate will overlap the upper edge of the film pack and the relation between the parts is such that the under side of the plate will press against the upper edge of the pack so as to effectually exclude the light and also to hold the pack firmly against being withdrawn by the successive manipulations of the tabs 8 necessary for the proper exposure of the successive films. After all exposures have been made the pack may be readily removed from the camera or holder by again retracting the plate 9 in the manner heretofore explained and then by introducing the end of the finger or a pencil or similar thing in the hole 14 the pack will be lifted so that its upper end will then project above the upper surface of the camera and may be readily laid hold of and the pack withdrawn. The size and location of the hole 14 is such that the pressure of the pack against the lower ledge or plate 4 will preclude the entrance of light to the films in the same manner as the similar plate or ledge 5 at the upper side of the camera precludes the entrance of light at that point.

It will be obvious to those who are familiar with this art that various modifications may be made in the details of construction and yet the essentials of the invention retained. For instance, the sliding plate 9 may be otherwise constructed and its said movements otherwise secured. The construction and operation which I illustrate and describe as one form only, are, however, desirable. Also other means than the hole 14 in the bottom of the camera for the initial projection of the exposed pack may be substituted for that hole. Indeed, various other modifications may be made in the details of construction.

I claim:

1. Apparatus of the class stated having a pack chamber provided with an opening in one edge only, through which the pack must be inserted and withdrawn, a movable plate substantially as long as said opening secured to the body part and adapted to partially cover and entirely uncover said opening, means within the body part to determine the focal plane and a spring which normally holds the front of the pack in the focal plane.

2. Apparatus of the class stated having a pack chamber provided with an opening in one edge only, through which the pack must be inserted and withdrawn, a movable plate substantially as long as said opening secured to the body part, slots in said plate and pins in the slots, whereby the plate may be made to move in directions parallel with the edges of the said opening and to partially cover and entirely uncover the same, means within the body part to determine the focal plane, and a spring which normally holds the front of the pack in the focal plane, the body part being provided with an opening through which pressure may be applied to the pack to start its ejection from the pack chamber.

3. In apparatus of the class stated, a pack chamber having an opening in one side only through which the pack must be inserted and withdrawn and through which also the tabs of the individual films project, and a cover plate substantially as long as said opening provided with means whereby it is adapted to move toward and from the same in parallel lines, said plate being fastened to the body part of the apparatus.

4. In apparatus of the class stated, having an opening for the insertion of a film pack, a movable plate located adjacent to the side of said opening and provided with diagonally arranged slots, pins working in the slots, and a flange on the plate whereby it may be moved.

In testimony whereof I have signed my name to this specification in the presence of two subscribing witnesses.

CARL BORNMANN.

Witnesses:
  GEO. W. TOPLIFF,
  A. DEICHELMANN.